May 12, 1925.
C. H. GREENE
COMBINATION TOOL
Filed May 26, 1924
1,537,766
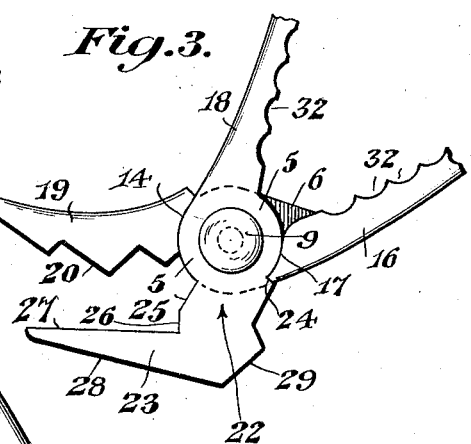
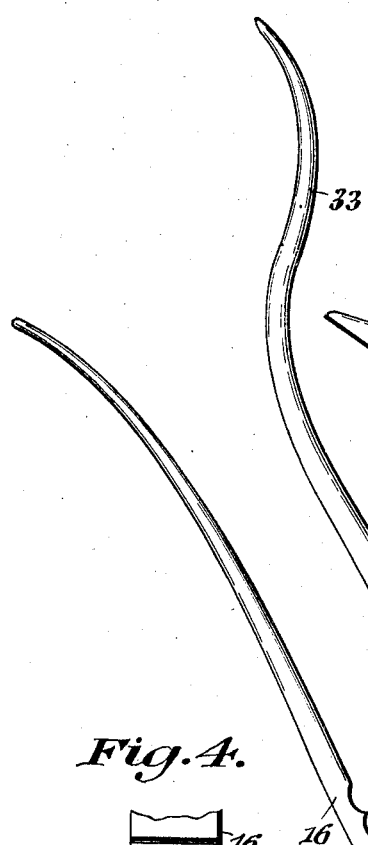
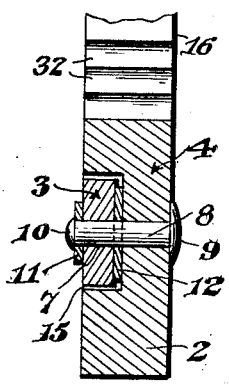
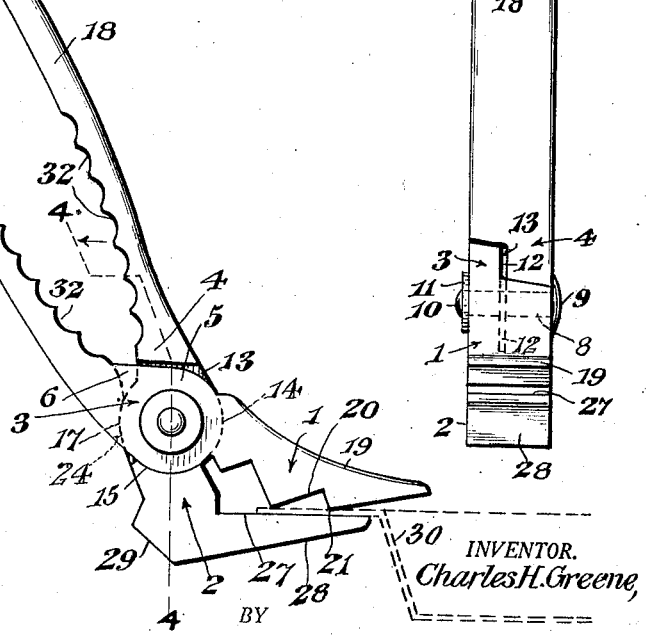
INVENTOR.
Charles H. Greene,
BY
Geo. F. Kimmel ATTORNEY.

Patented May 12, 1925.

1,537,766

UNITED STATES PATENT OFFICE.

CHARLES H. GREENE, OF WEST BLOCTON, ALABAMA.

COMBINATION TOOL.

Application filed May 26, 1924. Serial No. 715,988.

*To all whom it may concern:*

Be it known that I, CHARLES H. GREENE, a citizen of the United States, residing at West Blocton, in the county of Bibb and State of Alabama, have invented certain new and useful Improvements in Combination Tools, of which the following is a specification.

This invention relates to a combination tool; and has for its object to provide, in a manner as hereinafter set forth, a tool of such class, capable of serving for a large number of diversified purposes, such as a pan lifter, nut cracker, tack hammer, lemon squeezer, and tack puller.

Further objects of the invention are to provide, in a manner as hereinafter set forth, a combination tool which is simple in its construction and arrangement, strong, compact, durable, thoroughly efficient and convenient in its use for any one of its many diversified purposes, and inexpensive to manufacture.

With the foregoing and other objects in view, the invention consists of the novel construction, combination, and arrangement of parts, as hereinafter more specifically described and illustrated in the accompanying drawings, wherein is shown an embodiment of the invention; but it is to be understood that changes, variations, and modifications can be resorted to which come within the scope of the claims hereunto appended.

In the drawings wherein like reference characters denote corresponding parts throughout the several views:—

Figure 1 is a side elevation of a combination tool, in accordance with this invention;

Fig. 2 is an edge view thereof looking towards the front edge;

Fig. 3 is a fragmentary view in side elevation, with the tool in extended position; and Fig. 4 is a section on line 4—4, Fig. 1.

The tool comprises a pair of clamping jaws, one indicated by the reference character 1 and the other generally by the reference character 2. Each of the jaws is formed integral with a shank therefor, and the shank of one of the jaws is oppositely disposed with respect to the shank of the other of the jaws. Each shank is of less thickness than the thickness of its respective jaw and further is flush with one side face thereof. The shank of one jaw is also flush with one side face of the other jaw. The shank of the jaw 2 is of greater thickness than the shank of the jaw 1. The shanks of the jaws oppose each other, and the shank for the jaw 1 is indicated at 3 and the shank for the jaw 2 is indicated at 4.

Each of said shanks consists of a circular portion 5, and the circular portion 5 of the shank 3 is provided with a tangential extension 6, which projects from that side of the circular portion 5 opposite that side from which projects the jaw 1. Each of the circular portions 5 is provided with an opening 7, and extending therethrough is a headed pivot 8, having its head 9 abutting against the shank 4. The pivot 8 extends through the shank 3 and is upset, as at 10. Interposed between the upset end of the pivot 8 and the shank 3 is the washer 11. Mounted on the pivot 8 and interposed between the shanks 3 and 4, is a spacing washer 12, which maintains the outer face of the shank 3 flush with one face of the jaw 2.

The circular portion 5 of the shank 4 is provided with an extension 13, which projects at an angle with respect to the extension 6. The upper end of the body 1, at one side of the lower terminus of the shank 4 is curved, as at 14, and it provides a bearing for the circular portion 5 of the shank 4. The upper end of the jaw 2, at one side of the circular portion 5 of the shank 3, is curved as at 15 to provide a bearing for the circular portion 5 of the shank 3. Formed integral with the extension 6 is a substantially elongated handle member 16, having its lower end curved, as at 17, to provide a bearing for the circular portion 5 of the shank 4. Formed integral with the extension 13 is a handle member 18 of substantial length.

The jaw 1 is of substantial length, has its upper face curved, as at 19, and its inner face cut away, as at 20, to form a pair of gripping points 21. The inner point of said pair projects beyond the outer point of the pair.

The jaw 2 consists of a pair of legs 22, 23, and is offset as at 24 with respect to the circular portion 5 to provide a lateral shoulder. The leg 22 is formed of two portions extending at an angle with respect to each other, as indicated at 25, 26. The portion 26 is formed integral with the rear end of the leg 23.

The leg 23 extends at right angles with respect to the pivot 8 and has an elongated plane upper face 27 which opposes the gripping points 21. The leg 23 has a part of its bottom edge extending upwardly at an inclination, as at 28, in a direction towards the free end of the leg. The remaining part of the lower edge of the leg 23 extends rearwardly from the part 28 and at an upward inclination, as at 29, providing a striking face or a tack hammer head. When the jaws 1 and 2 are in closed position, the leg 22 depends from the pivot 8 and the leg 23 extends at right angles with respect to the pivot 8. The jaw 1, when the tool is closed, extends substantially at an obtuse angle with respect to the pivot 8. The jaws 1 and 2 cooperate to provide a pan lifter, as shown in Fig. 1, and with the pan indicated at 30.

The handle 18 is of greater length than the handle 16 and has its free terminus provided with a V-shaped notch 31, to constitute a tack puller. The inner sides of the handles 16 and 18 adjacent the pivot point are serrated, as at 32, and the serrated edges provide a lemon squeezer as well as a nut cracker. The jaws 1 and 2 also cooperate to provide a nut cracker. The outer terminal portion of the handle 18 is offset and curved, as indicated at 33, as well as projecting beyond the handle 16 in order to facilitate the use of the tool when pulling tacks.

The shoulder 24 is adapted to abut against the handle member 16 to limit the opening movement of the jaws relative to each other.

It is thought that the many advantages of a combination tool in accordance with this invention, can be readily understood, and although the preferred embodiment of the invention is as shown and described, yet changes in the details of construction can be had which will fall within the scope of the invention as claimed.

What I claim is:—

1. A device for the purpose set forth comprising a pair of shanks, superposed jaws extended therefrom, one of said jaws formed of a short and a long leg, the latter disposed at right angles to the former and having its inner face plane throughout, the other of said jaws having its inner face cutaway transversely thereof to provide an inner and an outer gripping point extending from one side to the other side of such jaw, said gripping points opposing and coacting with said plane surface, and the inner face of each of said jaws being of the same width with respect to each other.

2. A device for the purpose set forth composing a pair of superposed jaws pivotally connected together, one of said jaws having a part of its inner face disposed at right angles with respect to the remaining part thereof and plane throughout, the inner face of the other of said jaws cutaway transversely to provide an inner and an outer gripping point extending from one side to the other side of such jaw, said inner gripping point projecting beyond the other, said points coacting with said plane surface, the width of said plane surface being the same as the width of the inner jaw and the length of said gripping points.

In testimony whereof, I affix my signature hereto.

CHARLES H. GREENE.